United States Patent
Stern et al.

(10) Patent No.: US 9,971,672 B2
(45) Date of Patent: *May 15, 2018

(54) USING EMULATION TO DISASSOCIATE VERIFICATION FROM STIMULUS IN FUNCTIONAL TEST

(71) Applicant: PayPal, Inc., San Jose, CA (US)

(72) Inventors: Anne S. Stern, Mountain View, CA (US); Mark S. Petrovic, Petaluma, CA (US); Xuyuan Si, San Francisco, CA (US); Wilson Ross, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/144,306

(22) Filed: May 2, 2016

(65) Prior Publication Data

US 2016/0246702 A1    Aug. 25, 2016

Related U.S. Application Data

(63) Continuation of application No. 12/245,587, filed on Apr. 4, 2014, now Pat. No. 9,329,985.

(51) Int. Cl.
*G06F 9/44* (2018.01)
*G06F 11/36* (2006.01)

(52) U.S. Cl.
CPC ...... *G06F 11/3652* (2013.01); *G06F 11/3608* (2013.01); *G06F 11/3692* (2013.01)

(58) Field of Classification Search
CPC ............. G06F 11/3608; G06F 11/3652; G06F 11/3692
See application file for complete search history.

(56) References Cited

U.S. PATENT DOCUMENTS

| | | | |
|---|---|---|---|
| 6,067,565 A | * | 5/2000 | Horvitz ............. G06F 17/30861 707/E17.107 |
| 6,449,765 B1 | | 9/2002 | Ballard |

(Continued)

OTHER PUBLICATIONS

Wikipedia, "Model-based Testin", http://wikipedia.org/wiki/Model-based_testing, retrieved from the internet on Mar. 20, 2014, 5 pages.

(Continued)

*Primary Examiner* — Marina Lee
(74) *Attorney, Agent, or Firm* — Drinker Biddle

(57) ABSTRACT

Techniques for using emulation to disassociate verification from stimulus in functional test are described. In one approach, a computer stores first data representing an initial state of an application and second data representing the same initial state of a model application, wherein the model application models expected behavior of the application. The computer selects actions for the application to perform and causes both the application and the model application to perform the actions. The computer updates the first and second data to represent the state of both the application and the model application after performing the actions. The computer then compares the first and second data to determine whether both refer to the same state. In response to a determination that the first data and the second data do not refer to the same state, the computer stores data indicating a test failure.

20 Claims, 8 Drawing Sheets

(56) References Cited

U.S. PATENT DOCUMENTS

| | | | |
|---|---|---|---|
| 6,976,246 B1* | 12/2005 | Rosaria | G06F 8/34 |
| | | | 714/E11.157 |
| 7,260,573 B1 | 8/2007 | Jeh et al. | |
| 7,979,849 B2* | 7/2011 | Feldstein | G06F 11/3684 |
| | | | 714/39 |
| 9,020,873 B1* | 4/2015 | Duffy | G06F 9/444 |
| | | | 705/4 |
| 9,043,761 B2 | 5/2015 | Artzi et al. | |
| 9,329,985 B1* | 5/2016 | Stern | G06F 11/3692 |
| 2003/0076366 A1 | 4/2003 | Skjolsvold | |
| 2006/0075305 A1* | 4/2006 | Robinson | G06F 11/3684 |
| | | | 714/38.1 |
| 2006/0085681 A1* | 4/2006 | Feldstein | G06F 11/3684 |
| | | | 714/25 |
| 2006/0129892 A1* | 6/2006 | Diaconu | G06F 11/3672 |
| | | | 714/38.14 |
| 2010/0281022 A1* | 11/2010 | Gollapudi | G06F 17/30958 |
| | | | 707/723 |
| 2011/0191282 A1* | 8/2011 | Chan | G06Q 30/02 |
| | | | 706/52 |
| 2013/0290786 A1* | 10/2013 | Artzi | G06F 11/3676 |
| | | | 714/32 |
| 2015/0026563 A1 | 1/2015 | Tomoda | |
| 2016/0246702 A1* | 8/2016 | Stern | G06F 11/3692 |

OTHER PUBLICATIONS

B., Michael, "New Open Source page-component project. Next step in evolution of Page Object design pattern", dated Feb. 21. Retrieved from the internet on Mar. 20, 2014, 1 page.

Shafique, Muhammad, "A Systemic Review of Model Based Testing Tool Support", dated May 2010, 21 pages.

* cited by examiner

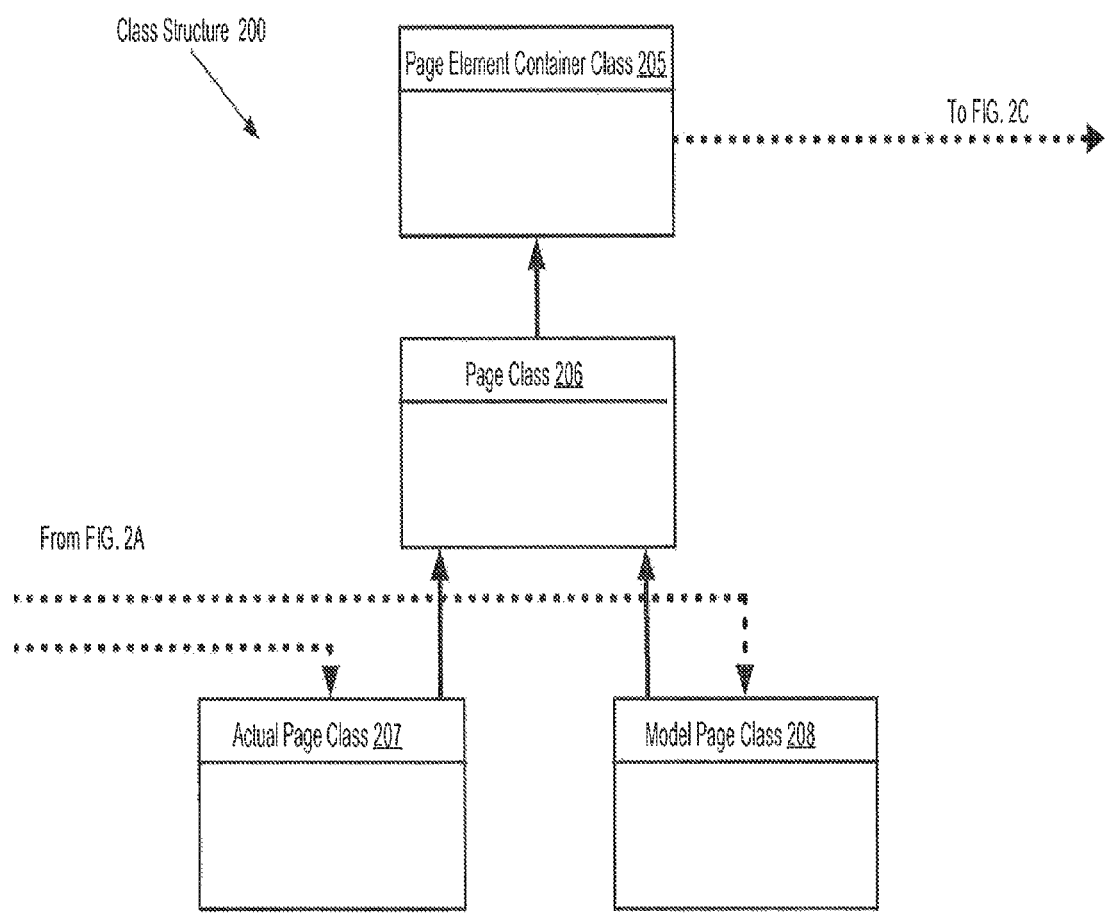

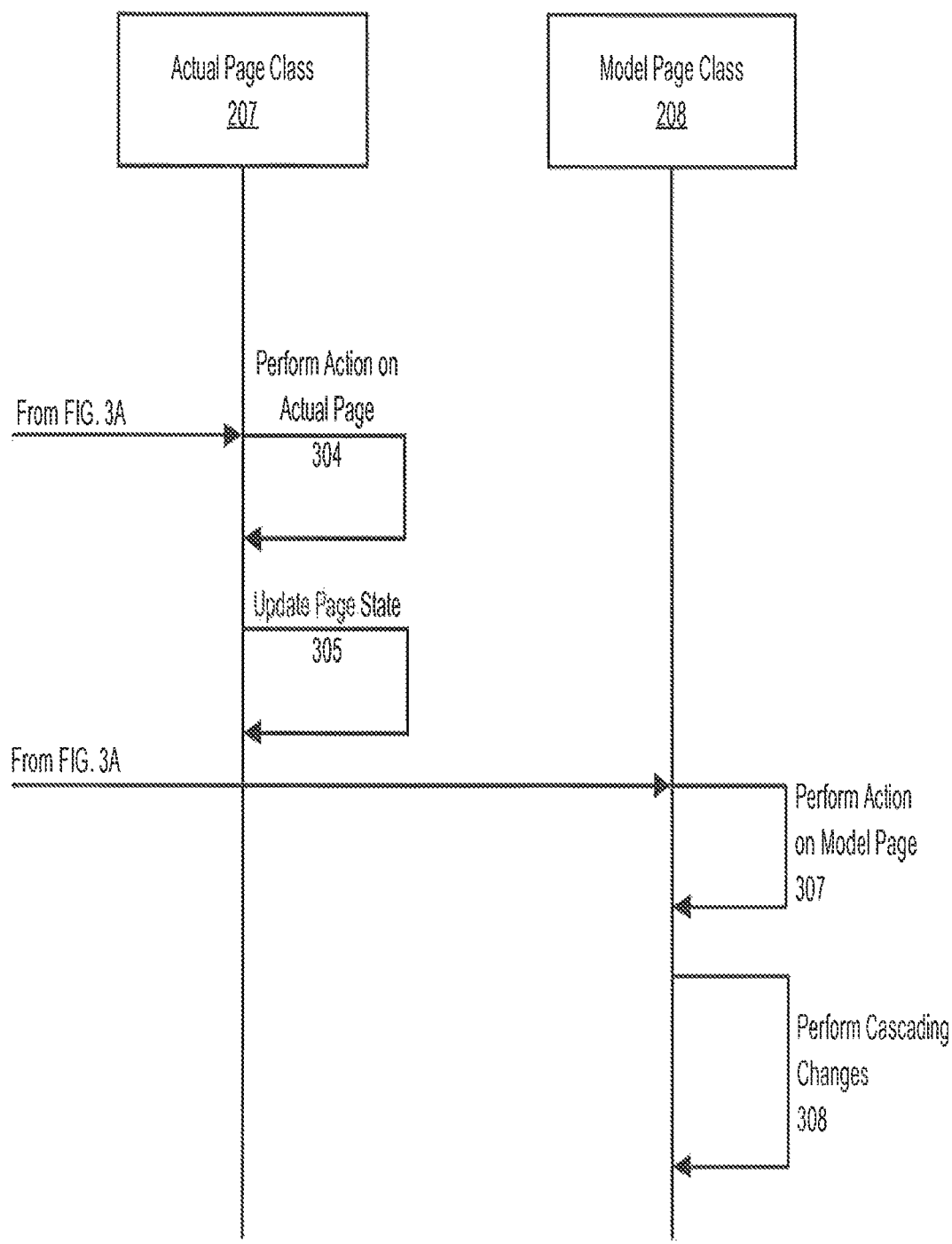

USING EMULATION TO DISASSOCIATE VERIFICATION FROM STIMULUS IN FUNCTIONAL TEST

This is a continuation application of application Ser. No. 14/245,587, filed on Apr. 4, 2014, now U.S. Pat. No. 9,329,985, issued on May 3, 2016, which is incorporated herein by reference in the entirety

TECHNICAL FIELD

The present disclosure generally relates to computer-implemented software testing, and relates more particularly to computer-implemented techniques for using emulation to disassociate verification from stimulus in functional test operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditional software testing is constrained in its efficacy, maintainability, and modularity by the coupling of the test traversal steps with the expected behavior and checks performed on the system under test. For example, the test cases may be hard-coded to perform a select number of hand-crafted scenarios which, if performed successfully, would indicate that the system is working properly. However, for any sufficiently large software project, even the best attempt at crafting varied and thorough test cases will fail to catch every edge case to which the software will eventually be subjected. Thus, traditional testing misses cases which the testers did not anticipate as potentially causing the system to exhibit unexpected behavior or did not think to check. Consequently, software is often released to the public with programming errors which should have been caught during the quality assurance stage of software development.

Due to the foregoing, there is a need in the industry for a randomized testing methodology that is randomized over either or both flow and data. Because randomized tests cannot be expressed or represented before execution as a series of actions and data and their associated expected outcomes (because actions and data are not pre-determined), a randomized test flow necessitates a software testing methodology that can separate test steps (or stimulus) from the checks performed on the system under test. By separating test stimulus from checks, stimulus may be selected randomly during the test progression and checks may be invoked and performed in response to the steps selected. In this way, since a randomized test generated by a system with separated stimulus and emulation/checking tests an arbitrarily lengthy, complex, and interesting set of scenarios generated on the fly, the test bypasses the limitations of premeditated case generation, and checks every possible element of the system at each step of the test. As test writers will never premeditate all interesting cases, and thousands of checks can never practically be programmed into every test by hand, efficacy and power of software testing can be significantly increased.

SUMMARY

The appended claims may serve as a summary of the invention.

BRIEF DESCRIPTION OF THE DRAWINGS

In the drawings:

FIG. 2B illustrates a second view of an example class structure for a test platform according to an embodiment.

FIG. 4B illustrates a second view of an example process for testing an application according to an embodiment.

DETAILED DESCRIPTION OF EXAMPLE EMBODIMENTS

Figure 1:
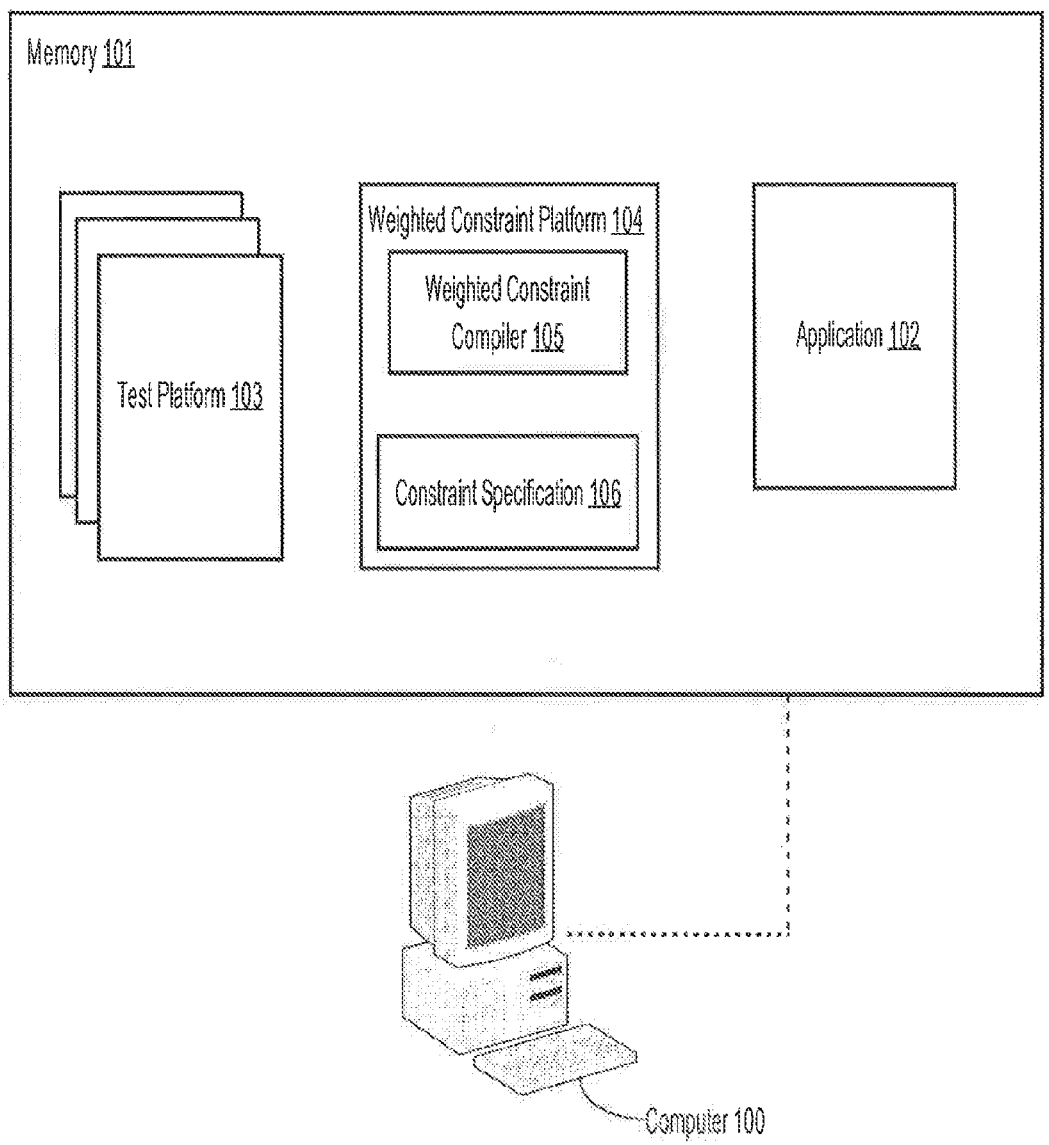
FIG. 1 illustrates an example operating environment upon which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Operating Environment
3.0 Example Class Structure
4.0 Weighted Constraint Overview
5.0 Example Testing Flow
6.0 Hardware Overview
7.0 Extensions and Alternatives 1.0 General Overview In an approach, in order to separate stimulus from emulation, a context object is used and instantiated twice in two forms. The first form is the "Actual" context object and the second form is the "Model" context object. Each context object represents the current design context under test. Each context object is aware of the functional elements within that context, the constraints on the functional elements, how the functional elements are accessed, and how the constraints interact with the functional elements. For example, a given web or application page may be a context and represented by a context object. In this case, the buttons and functionality within the page could be considered the functional elements contained within the context object.

The distinct instantiations of the Actual context object and the Model context object allow the separation of concerns between stimulus and checking. The Actual context object is used to perform actions on the actual (or "stimulus") context under test. For example, in the case of a web page, the Actual context may call or perform actions on the actual web page itself. The resulting state of the Actual context object is updated to reflect the actual result observed. As a result, the Actual context object represents the state of the actual context under test when subjected to the stimulus. In parallel, the same set of actions is performed against the Model page object. However, the resulting state of the Model context object is derived from emulation of the context's "cascading", expected correct behavior in response to stimulus. For example, the emulation may update the state of the Model context object to indicate how the state theoretically should appear after being subjected to the stimulus. After each action that is performed in parallel on the Actual and Model objects, the states of the Actual and Model objects are then compared. Any difference represents a test failure. Furthermore, in addition to the comparison checks, additional "absolute" checks may be performed on the Actual context object at any functional juncture regardless of the test state. For example, if a field in a web page is only valid for a certain range of values, the field being set to an invalid value may result in a test failure regardless of whether or not the comparison test is performed.

In some embodiments, context objects make random flow and data selection during the test by referencing an independent Weighted Constraint Driver. For example, the Weighted Constraint Driver may be a class that is compiled on the fly prior to each test session that provides randomized values for the context objects to use during the test. In some embodiments, the Weighted Constraint Driver provides randomized values according to a custom grammar configured to associate values and weights with labels which the context object can request. For example, the grammar may specify that for the label "Country", the potential values are USA with a 50% probability, Canada with a 30% probability, and Mexico with a 20% probability. Thus, if the context object requests a value for the label "Country", the Weighted Constraint would respond by returning one of the values based on the aforementioned distribution. Similarly, the grammar may specify potential actions that can be taken within the given context and the probability of performing each action during the test. Thus, the flow and data of a test can be determined by the relative weights and values specified in the weighted constraint grammar. In some embodiments, the Weighted Constraint Driver selects values based on a random numbered generator initialized with a value referred to as a "seed". Thus, given the same series of requests and the same seed, the Weighted Constraint Driver produces the same outputs. One situation in which using the same seed is useful is to repeat tests after the subject has been updated to resolve failures discovered during previous tests to determine if the debugging was successful. Another situation in which using the same seed is useful is to repeat test failures to instrument the failed code to gain more information about the failure. On the other hand, if the seed value is changed, a different test can be generated based on the same series of requests to try to discover test failures which may not have been generated by previous seed values. In this way, a seed-based test reproduction approach is useful to easily generate a different test with different random data and/or flow decisions by using the same code and varying only the seed value in the new test run.

In an embodiment, a method comprises: storing first data representing an initial state of an application to be tested and second data representing the same initial state of a model application, wherein the model application models expected behavior of the application to be tested; selecting one or more actions for the application to perform; causing the application to perform the one or more actions and updating the first data to represent a state of the application that results from the application performing the one or more actions; causing the model application to perform the one or more actions and updating the second data to represent a state of the model application that results from the model application performing the one or more actions; comparing the first data and the second data to determine whether the first data and the second data refers to a same state; in response to a determination that the first data and the second data do not refer to the same state, storing data indicating a test failure; wherein the method is performed by one or more computing devices.

In an embodiment, the method further comprising storing data representing a set of potential actions that the application can perform, wherein selecting the one or more actions for the application to perform involves randomly selecting the one or more actions from the set of potential actions.

In an embodiment, the method further comprises storing data representing a set of potential initial states of the application and randomly selecting the initial state of the application from the set of potential initial states.

In an embodiment, at least a particular action of the one or more actions requires one or more input values and further comprising storing data representing a set of potential input values for the particular action and randomly selecting the one or more input values to use for the particular action from the set of potential input values.

In an embodiment, the method further comprises storing a constraint specification which specifies, for one or more labels a set of values for each of the one or more labels and selection data indicating a likelihood that each value of the set of values will be selected and wherein at least one of: the randomly selecting the one or more actions, randomly selecting the initial state, or randomly selecting the one or more input values, involves requesting one or more values for a particular label and randomly selecting the one or more values from among the set of values for the particular label based on the selection data.

In an embodiment, the application to be tested is a web site and the initial state of the application represents a state of an initially accessed web page of the web site.

In an embodiment, the first data and the second data specify one or more widgets contained in the initially accessed web page.

In an embodiment, causing the application to perform the one or more actions involves accessing a browser loaded with the initially accessed website via an application programming interface and instructing the browser to perform the one or more actions on the initially accessed website.

In an embodiment, updating the first data involves scanning the initially accessed website via the browser and updating the first data to represent any changes to elements of the initially accessed website that occurred due to performing the one or more actions on the initially accessed website.

In an embodiment, the method further comprises in response to a determination that the first data and the second data do refer to the same state, selecting a second one or more actions for the application to perform.

In other embodiments, the invention encompasses a system, computer apparatus, and a computer-readable medium configured to carry out the foregoing steps.

2.0 Example Operating Environment

FIG. 1 illustrates an example operating environment upon which an embodiment may be implemented. In FIG. 1, a computer 100 is communicatively coupled to a memory 101 which stores an application 102 under test, a test platform 103, and a weighted constraint platform 104 which comprises a weighted constraint compiler 105 and a constraint specification 106. Although only a particular number of elements are depicted in FIG. 1, a practical environment may have many more, perhaps hundreds or thousands of each of the depicted elements. In addition, the computer 100 may have additional elements (for example, processors, buses, input devices, network adapters, etc.) which are not explicitly shown in FIG. 1. Furthermore, although certain components in FIG. 1 are depicted as being contained in the memory 101 of a single computer 100, in a practical environment the components may be distributed across one or more computers which are communicatively coupled by a network, such as a Local Area Network (IAN) or Wide Area Network (WAN). For example, the test platform 103 and weighted constraint platform 104 may be stored on computer 100 and the application 102 under test may be stored on a separate computer. One scenario where this could occur is in the context of testing a web page, where the application 102 under test represents software stored on a web server and the testing is being driven by a remote computer.

For brevity, certain components, such as the application 102, test platform 103, or weighted constraint platform 104 may be described as performing an action such as invoking other components, manipulating data, and so forth. However, in some implementations, such as when the components are implemented as executable code, the aforementioned performance should be understood as shorthand for one or more processors of the computer 100 performing the action in response to executing the code. For example, in the case where the application 102 represents a web site, a browser or test emulator loading a page from the web site may be described as "clicking" a widget, but in actuality it is the computer 100 running the browser which performs the aforementioned action.

In an embodiment, computer 100 comprises an individual computing device such as personal computer, workstation, laptop, netbook, tablet computer, or smartphone. For example, the computer 100 may implement any or all of the components described below in the "Hardware Overview".

In an embodiment, memory 101 represents one or more storage devices (for example, RAM, solid state drives, RAIDs, etc.) upon which the application 102 under test, test platform 103, and constraint platform 104 are stored for access by the computer 100.

In an embodiment, the application 102 represents a software module that will be tested. For example, the application 102 may represent a software application, a service, a web server program, a web site, a database program, or any other type of software program. The exact context of the application 102 is not critical to the techniques described herein. In an embodiment, the test platform 103 interacts with the application 102 by utilizing an inter-process communication mechanism, such as an Application Programming Interface (API), to cause the application 102 to perform one or more specified actions which will be monitored during the testing process. In other embodiments, the test platform 103 may interact with the application 102 through an intermediary. For example, the application 102 may be a web site which is accessed and manipulated by a web browser which is controlled by the test platform 103 through an API or other communication mechanism. In other embodiments, the application 102 represents specialized hardware components or a combination of hardware and software components. For the purpose of illustrating clear examples, the following descriptions will assume that the testing is in the context of ensuring the proper functionality of a web site. However, while testing a web site is used as a representative example, the techniques described herein are not limited to the context of testing a website.

In an embodiment, the test platform 103 represents a software module that drives the testing of the application 102. In some embodiments, the test platform 103 comprises instructions or code which drives the test. However, in other embodiments, the test platform 103 may comprise specialized hardware components or a combination of software and hardware components which are configured to perform the test. For the purpose of illustrating clear examples, it will be assumed that the test platform 103 is implemented by code structured according to the principles of object oriented programming. Thus, the structure of the test platform 103 will be described with references to multiple classes, each representing a particular concept and interrelated through association, inheritance, or any other object-oriented structural concept. In such embodiments, the classes of the test platform 103 may be written in any number of one or more object-oriented programming languages, such as Java, C#, Ruby, Python, C++ and so forth. However, the exact language used to code the test platform 103 is not critical to the techniques described herein. In embodiments which are implemented in hardware or through a combination of hardware and software, each class or combination of classes may be represented by hardware components which perform the same functions.

In an embodiment, the test platform 103 performs the test by maintaining a context object which represents the state of both the actual application 102 (the actual context object) under test and a model of the application 102 (the model context object) which represents the expected behavior. The test platform 103 then chooses an action that the application 102 will perform and causes both the actual application 102 and a model of the application 102 to perform the chosen action. The test platform 103 then determines whether the action resulted in any differences between the actual application 102 and the model which would indicate a test failure. For example, in the context of testing a web page, the test platform 103 may perform the action on the actual web page via API calls to a browser and perform the same action on the model representation of the web page using instructions which simulate how the web page should perform in response to the action. The test platform 103 then compares the states of the actual web page and the model. For instance, the test platform 103 may determine that the information, fields, widgets, frames, or other information displayed by the web site have been set to the correct values and is consistent between the actual and model representations. For the purpose of the following discussion a "widget" refers to an element of a page that is configured to be interacted with by a user to supply input. Thus, "state" as used in the context of testing a web site may represent one or more features of the active web page. However, in other embodiments, "state" may also include features of the web page or web site that are not explicitly displayed by the browser, such as cookies or other information that is not typically displayed.

In an embodiment, the weighted constraint platform 104 comprises a weighted constraint compiler 105 and a constraint specification 106. In an embodiment, the weighted constraint compiler 105 represents instructions configured to translate a constraint specification 106 into one or more classes that can be utilized by the test platform 103 to generate random values during the testing of the application 102. For example, if the test platform 103 represents a collection of Java class files, the weighted constraint compiler 105 may transform the constraint specification 106 into a collection of Java classes or a jar package which can be incorporated into the test platform 103 to provide randomized values. In an embodiment, the constraint specification 106 is a document which defines potential values and the likelihood that a potential value will be chosen (referred to as a weight) when the test platform 103 performs a decision relating to the value of a variable, a starting state to begin the test, and/or the actions performed at various junctures during the test. For example, the constraint specification 106 may be established to mimic the distribution of values that is expected to be input by users of the application 102 under test or may be configured to test edge cases that would rarely be encountered in practice. Thus, for instance, if the test platform 103 decides to perform an action which requires a "Country" field to be filled out, the constraint specification 106 may define the probability with which each country will be selected and the code generated by the weighted constraint compiler 105 may be a class, method, function, module, or other construct that returns a country value to the test platform 103 based on the specified probabilities. In other embodiments, rather than relying on a static constraint specification, the constraint compiler 105 may periodically obtain updated metrics from a metric server which tracks the aforementioned information dynamically and regenerates the code used to supply metrics to the test platform 103 to keep the tests up-to-date. The weighted constraint compiler 105 and the constraint specification 106 will be described in more detail below in the "Weighted Constraint Overview". In other embodiments, the weighted constraint platform 104 may be implemented by specialized hardware components or a combination of software and hardware components.

3.0 Example Class Structure

Figure 2A:
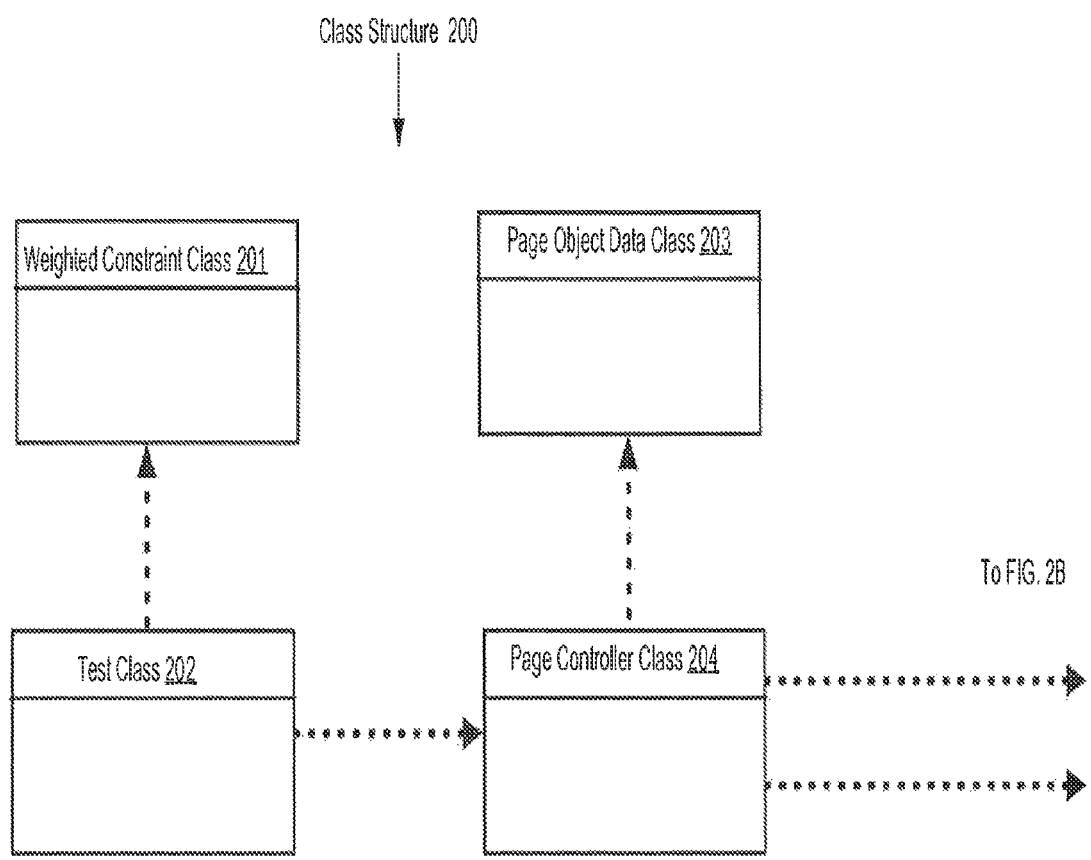
FIG. 2A illustrates a first view of an example class structure for a test platform according to an embodiment.
Figure 2C:
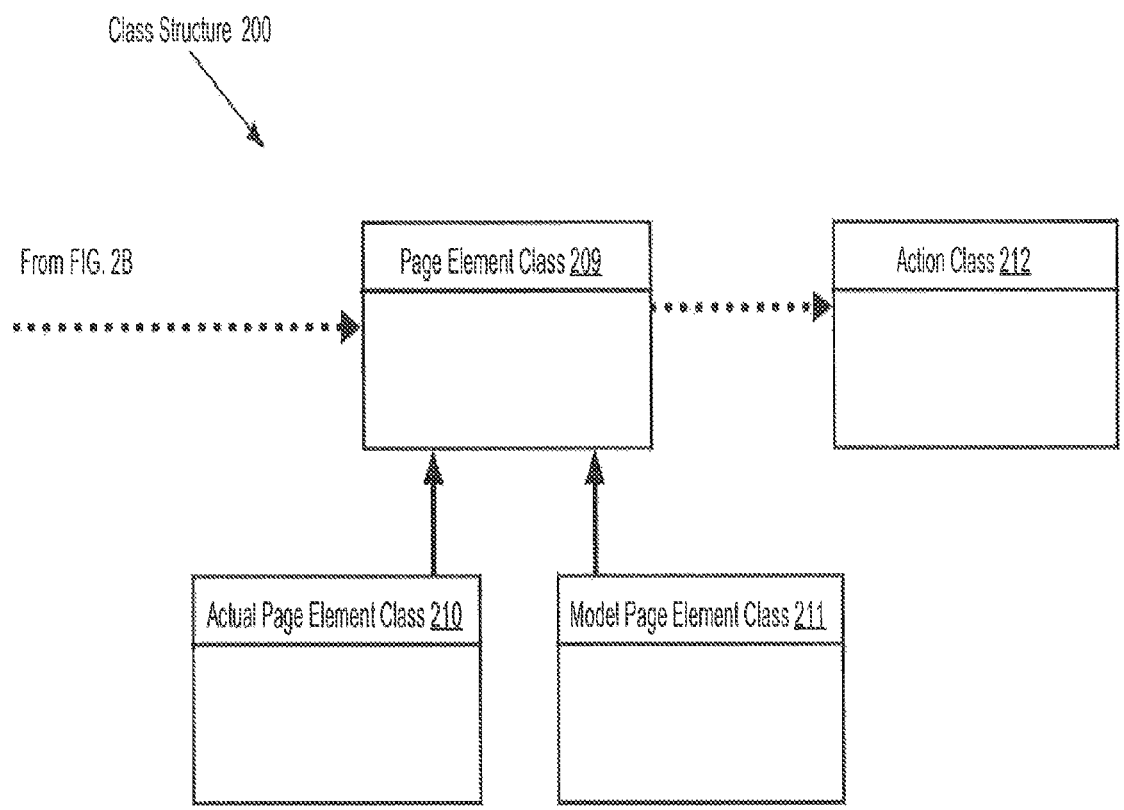
FIG. 2C illustrates a third view of an example class structure for a test platform according to an embodiment.

FIG. 2A, FIG. 2B, and FIG. 2C illustrate a first, second, and third view of an example class structure 200 for the test platform 103 according to an embodiment. In FIG. 2A, the class structure 200 includes a weighted constraint class 201, a test class 202, a page object data class 203, and a page controller class 204. In FIG. 2B, the class structure 200 also includes a page element container class 205, a page class 206, an actual page class 207 and a model page class 208. In FIG. 2C, the class structure 200 also includes a page element class 209, an actual page element class 210, a model page element class 211, and an action class 212. Although the class structure 200 illustrated in FIG. 2A, FIG. 2B, and FIG. 2C depict only one of each type of class, in a practical environment the class structure 200 may contain many other classes which inherit features of the depicted classes, invoke the depicted classes, or use objects instantiated from the depicted classes. Furthermore, other embodiments may rearrange the organization of the classes depicted in the class structure 200 by adding to the depicted classes, omitting certain depicted classes, or merging one or more of the depicted classes. Within FIG. 2A, FIG. 2B, and FIG. 2C the class structure 200 is depicted as a collection of classes where the relationships between the classes are represented with arrows. A solid arrow denotes that one class inherits the other class and the dotted arrow denotes that one class contains or otherwise uses an object of the other class.

The classes illustrated in FIG. 2A, FIG. 2B, and FIG. 2C assume that the test platform 103 is being used in the context of testing a web site. Since a web site often comprises many different web pages, the class structure 200 may contain a generic page class 206 which is inherited by multiple specialized classes representing individual web pages (SignUpPage class, LoginPage class, and so forth) of the website. However, for the sake of brevity, the class structure 200 will be described in relation to the generic classes, which may be specialized through techniques such as inheritance to include the features and functionality of specific pages.

In reference to FIG. 2B, the page class 206 represents the structure of a particular web page. Thus, the page class 206 defines the elements, such as the fields, information boxes, widgets, and so forth that are displayed when the web page is interpreted by a browser. The page class 207 inherits the page element container class 205, which defines the data structure used to store and access the individual elements of the page. For example, the page element container class 205 may define an array, linked list, or other data structure which organizes and stores the elements of the page and functions providing access to the aforementioned data structure.

In FIG. 2C, the page element class 209 defines the individual page elements. The page element class 209 may be inherited by specialized classes which represent the state and functionality of specific page elements such as a clickable button, a field for entering information, a dropdown menu, radio selection buttons, and so forth. For example, the page element class 209 may model the state of a dropdown menu by defining the options presented in the dropdown menu and storing a reference indicating the currently selected option. The page element class 209 contains one or more instantiations of the action class 212 which defines the specific actions that may be taken with regard to the particular page element. For example, a dropdown menu may contain a "select N" action which selects the Nth option in the menu, a field may contain a "type in text" action for filling in the field, and so forth. In some embodiments, the action class 212, in addition to defining the functionality of a particular page, also specifies the "cascading" behavior of actions performed on the page element. For example, a button that is part of an accordion of data elements may cause the accordion to open/close, but also cause changes to other widgets, such as causing certain fields to be added or removed from the page.

In other embodiments, the page class 206 may be substituted for a class pertaining to the state of an alternative context. For example, the alternative context may be the testing of a database mining application which monitors user signups to a particular website. Thus, the page class 206 may be replaced with a class that identifies the structure of the database utilized by the database mining application. Consequently, other classes, such as the page element container class 205 and the page element class 209 may be substituted to define context specific data types, such as individual tables, database objects, records, etc. Thus, one skilled in the art would recognize how to apply the structure described herein to testing performed in virtually any context.

In some embodiments, the page under test may be utilized in multiple sub-contexts. For example, the page may be displayed differently depending on the type of browser or platform used to access the page. As another example, the website may support both traditional web pages along with specialized display screens for mobile devices. As a result, the page class 206 may be inherited by specialized classes within the class structure 200 which pertain to each sub-context. For example, if the test context includes both webpages and mobile application display screens the test platform 103 may include a specialized class for each which directly or indirectly inherits the page class 206 and defines the unique functionality and testing models for their respective contexts. Furthermore, other classes in the class structure 200 may also be modified in the same fashion to account for the functionality of the application 102 in the different sub-contexts.

In an embodiment, the page class 206 is inherited by the actual page class 207 and the model page class 208. The actual page class 207 represents the state and functionality of the actual page being tested. An implementation of the actual page class 207 may invoke the actual page being tested (for instance, via an API a browser or simulation program) to perform a requested action and track how the actual page changed as a result of that action. For example, if the selected action is to click a button, the actual page class 207 may make an API call to a browser to perform the action on the page and then perform another API call to extract the browser's new state and update the state of the actual page class 207 accordingly. The model page class 208 represents the state and functionality of the model page intended to simulate the expected behavior of the page being tested. Thus, an implementation of the model page class 208 may contain test code which simulates how the actual page under test should function when performing the action.

For example, the page class 206 may define an interface which specifies the elements that a particular page contains. The actual page class 207 and the model page class 208 inherit the interface and implement the functionality of the page elements. The actual page class 207 implements the functionality by invoking the application 102 and tracking the state of the actual page. The model page class 208 implements the functionality using model test code that simulates the expected behavior of the action. For example, assuming the action is to "click" a button, the model page class 208 may manipulate the appropriate data structures to simulate the expected state after the button is clicked. The actual page class 207, on the other hand, would apply the stimuli to the actual page, determine the changes which occurred on the actual page, and update the data structures accordingly. The bifurcation of the page class 206 into actual page class 207 and model page class 208 allows for parallel stimulus of actual and model pages and the separation of concern between stimulus and emulation/checking. Taken together, the actual page class 207 and model page class 208 (along with the inherited and/or associated classes), constitute a context object representing the testing state. In another embodiment, the actual and model classes may be the same class, containing the required functionality for both model and actual behaviors. For example, the class may have one or more instantiations configured at run time for actual behavior and the others configured at run time for model behavior.

For organizational purposes, the aforementioned actions may be implemented in the class structure 200 by using the same bifurcation for each page element, resulting in an actual page element class 210 and a model page element class 211. Similar bifurcation may also be performed for other classes in the class structure, such as the page element container class 205. Thus, the actual page class 207 stores objects of the actual page element class 210 in the data structure inherited from the page element container class 205 and the model page class 208 stores objects of the model page element class 211 within its respective data structure.

In an embodiment, the action class 212 implementation of the actual page element class 210 contains the instructions which invoke the actual page to perform the action and the action class 212 implementation of the model page element class 211 contains instructions which simulate the expected behavior of the action. For example, in the case selecting an item from a dropdown menu which causes the web page to update a text box, the implementation of the action for the actual page element class 210 may invoke an API of a browser which has the page loaded to cause the browser to select the menu item. The test platform 103 then scans the webpage and updates the data structures in the actual page class 207 associated with any elements which have changed. If the action was performed correctly, the data structure representing the text box will be updated with the correct text. If the application under test did not perform the action correctly, it updates its state regardless according to the incorrect action. The implementation for the model page element class 211 simulates the performance of the action, and may perform the action by executing instructions which modify the data structure representing the text box to contain the expected text. In other words, the model page element class 211 updates the state of the model page to result in what the state should be after the action is performed, whereas the actual page element class 210 determines the state of the page based on what is actually performed on the page under test. As a result, the test platform 103 is able to compare the data structures representing the states of the elements of the actual and model page to check for discrepancies.

In an embodiment, the test class 202 represents the driver that runs the test. In an embodiment, the test class 202 invokes the weighted constraint class 201 to determine a starting page for the test. The weighted constraint class 201 returns data specifying the page where the test should begin. The test class 202 then creates an instantiation of the page controller class 204 for the starting page and repeatedly instructs the page controller class 204 to perform one or more actions on the page. The page object data class 203 defines the actions that can be performed on any given page and the probabilities with which those actions are taken. The page controller class 204 instantiates a context object for the starting page, determines an action via a request to the page object data class 203, and causes both the actual and model page to perform the action. In some embodiments, the actions defined by the page controller class 204 may be individual actions taken on particular widgets or collections of actions that perform a related function. For example, for a signup page, the "SignUp" action may perform multiple separate actions such as filling in the appropriate fields (name, address, screen name, password, etc.), clicking a submit button, updating one or more widgets, and so forth which are defined in the action class 212 for the individual widgets. In an embodiment, the page controller class 204, as a result of performing an action, returns a reference of the page controller class 204 for the current page of the website to the test class 202. For example, if performing a particular action changes the page of the website that is being displayed, the page controller class 204 may instantiate a page controller object for the new page and return that object to the test class 202. As a result, the test class 202 begins sending instructions to the new page controller class 204 to perform an action for testing. Otherwise, the page controller class 204 returns a reference to itself and the test continues with the same page. In some embodiments, the resources required to maintain the old page controller instantiation may be released by the computer when the test switches to a new web page.

In an embodiment, the weighted constraint class 201 and the page object data class 203 are produced by the weighted constraint compiler 105 to provide flow and data decisions to any requesting agent or component. In an embodiment, the weighted constraint class 201 acts as a randomization engine for supplying random values and the page object data class 203 acts as a wrapper around the weighted constraint class 201. However, since the page object data class 203 is a structure used to simplify the organization of the class structure 200, other embodiments may omit the wrapper class and use only the weighted constraint class 201 instead.

4.0 Weighted Constraint Overview

Figure 3:
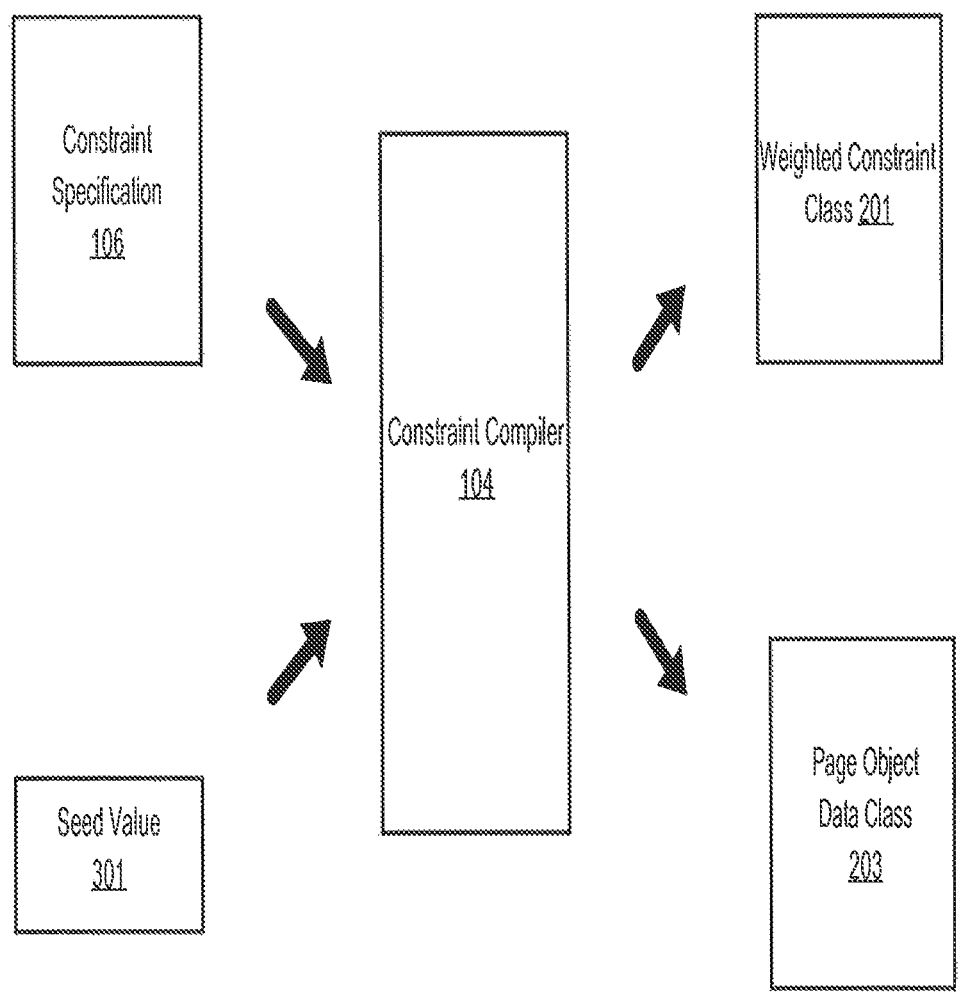
FIG. 3 illustrates an example process for compiling a constraint specification according to an embodiment.

FIG. 3 illustrates the functionality of the weighted constraint compiler 105 in block diagram form according to an embodiment. In FIG. 3, the weighted constraint compiler 105 receives a constraint specification 106 and a seed value

301. The weighted constraint compiler 105 then uses the aforementioned inputs to generate the weighted constraint class 201 and the page object data class 203.

The classes produced by the weighted constraint compiler 105 are used by the test platform 103 to acquire constrained random values, such as strings, Booleans, integers, etc. to use as input to actions which will be tested on the application 102 under test or to select the next action to perform during the test. In an embodiment, the constraint specification 106 is a document which specifies one or more labels, one or more potential values (or value ranges) for each label, and the probability (weight) with which each of the potential values will be chosen for the label.

For example, a portion of the constraint specification 106 defining random string values may appear as follows:
EmailDomain ("gmail.com" 3, "yahoo.com" 4, "hotmail.com" 2);
which means that the label "EmailDomain" can be one of three potential values, "gmail.com" with a weight of 3, "yahoo.com" with a weight of 4, or "hotmail.com" with a weight of 2. Thus, when the weighted constraint class 201 generated based on the example specification is asked for a value relating to an email domain, the weighted constraint class 201 will return one of the aforementioned values with a probability based on the value's associated weight. For example, the weighted constraint class may return "gmail.com" 3 out of 9 times, "yahoo.com" 4 out of 9 times, and "gmail.com" 2 out of 9 times (individual weight divided by total weight). In an embodiment, if a weight is omitted for a potential value in the constraint specification 106, the weight is assumed to be 1.

As another example, a portion of the constraint specification 300 defining random integers may appear as follows:
SendAmount {[1, 49] 1, [50, 2999] 49};
which means that the value of the label "SendAmount" will be randomly selected from the range of [1, 49] with a weight of 1 or randomly selected from the range of [50, 2999] with a weight of 49. Thus, 1 out of 50 times the weighted constraint class 201 will return a value between 1 and 49, and 49 out of 50 times the weighted constraint class 201 will return a value between 50 and 2999.

As yet another example, a weighted Boolean may be defined in the constraint specification 300 as follows:
PushDelivery {false 3, true 1};
which means that the weighted constraint class 201 will return the value false 3 out of 4 times and the value true 1 out of 4 times for the label rush delivery.

In an embodiment, the labels and their associated values are structured in the weighted constraint class 201 as a "playlist". For example, the playlist for the label EmailDomain described above may consist of nine slots (the sum of the weights), where "gmail.com" occupies three of the slots, "yahoo.com" occupies four of the slots, and "hotmail.com" occupies two of the slots. A constrained value is selected from the playlist by choosing a random slot within the playlist and returning the value associated with the chosen slot. In some embodiments, the function used by the weighted constraint class 201 to determine the random slot is based on random number generator seeded with an initial value (the "seed"). In some embodiments, the weighted constraint compiler 105 is configured to produce a weighted constraint class 201 that uses the received seed value 301 as the seed for the aforementioned random number generator. As a result, the values produced during a given test can be reproduced by reusing the same seed value 301. For example, after testing has discovered a bug within the application 102, the application developers may wish to debug the application 102 and run the same exact test on the new version to determine whether the bug has been fixed.

In an embodiment, the weighted constraint compiler 105 is executed by the computer 100 before compiling and running the test platform 103. For example, certain modern build tools, such as Maven and Gradle in the context of Java, apply the notion of a software build lifecycle. When a software project is built with this type of tool, the tool performs the compilation process in a well-defined order. For example, when invoking the build, the tool may execute the weighted constraint compiler 105 to produce the classes for the test platform 103, compile the test platform 103, and then run the tests.

In some embodiments, the weighted constraint compiler 105 comprises a lexical analyzer and parser which ensure that the constraint specification 300 adheres to a particular grammar. For example, tools such as ANTLR for Java can be used to automatically generate code that will parse and perform lexical analysis on the constraint specification 300 based on a grammar file.

In some embodiments, the weighted constraint class 201 and the page controller class 204 are configured to take advantage of reflection to facilitate the performance of randomized actions. Reflection is the ability of a computer program to examine and modify the structure and behavior of an object at runtime. For example, in the context of Java, reflectivity may be implemented using Java Annotations to add syntactic metadata to be added to source code. As described above, the test class 202, which constitutes the logical "main( )" entry point for the test, will request a starting page from the weighted constraint compiler 105. The constraint specification 106 corresponding to the request may be in the form:
StartPage {"SignupPage 3, HomePage 2, ContactPage 2};
which specifies the possible starting pages for the test and the probability of starting on each potential page. Assume that the weighted constraint compiler 105 returns the string "SignupPage" to the test class 202. The test class 202 may use reflectivity to determine the class which corresponds to the returned label. Using Java Annotations as an example, the page controller class 204 for the "SignupPage" may take the following form:

```
@Controller(name = "SignUpPage")
    public class SignUpPlatformPageController extends
    PlatformPageController<SignUpPlatformActualPage,
    SignUpPlatformModelPage> {
    ...
      @Performance(value = "signUp")
      public PlatformPageController signUp( ) {
        String firstName = pageObjectDataSource.getFirstName( );
        String lastName = pageObjectDataSource.getLastName( );
        String email = String.format("%s@%s", RandomGenerator.randomStr(15),
    pageObjectDataSource.getMyEmailDomain( ));
```

-continued

```
        String emailVerification =
    pageObjectDataSource.getMatchReenterEmailAddress( ) ? email :
    String.format("%s.x", email);
            String phoneNumber = pageObjectDataSource.getMyPhoneNumber( );
            String password = RandomGenerator.randomStr(15);
            String passwordVerification =
    pageObjectDataSource.getMatchReenterPassword( ) ? password :
    StringUtils.mungePassword(password);
            typeInValue(SignupPageWidgetNames.FIRST_NAME_INPUT, firstName,
        Check.YES);
            typeInValue(SignupPageWidgetNames.LAST_NAME_INPUT, lastName,
        Check.YES);
            typeInValue(SignupPageWidgetNames.EMAIL_INPUT, email,
        Check.YES);
        typeInValue(SignupPageWidgetNames.EMAIL_VERIFICATION_INPUT,
    emailVerification, Check.YES);
        typeInValue(SignupPageWidgetNames.PASSWORD_INPUT, password,
    Check.YES);
    typeInValue(SignapPageWidgetNames.PASSWORD_VERIFICATION_INPUT,
    passwordVerification, Check.YES);
        typeInValue(SignupPageWidgetNames.PHONE_NUMBER_INPUT,
    phoneNumber, Check.YES);
        click(SignupPageWidgetNames.CREATE_ACCOUNT_BUTTON,
    Check.NO);
        return injector.getInstance(OptionPlatformPageController.class);
    }
}
```

Thus, the "SignUpPageController" is annotated with the name "SignUpPage". At runtime, the test class 202 can query for an object which corresponds to the class whose "name" attribute is "SignUpPage". Furthermore, when page controller class 204 invokes the page object data class 203 to determine which action to perform, reflectivity can be used again to translate the returned value of the label into the method corresponding with the returned action. For example, the signUp( ) method is annotated the name attribute "SignUp" and can be referenced in the constraint specification 106 by that value. As a result, by utilizing reflectivity, the test platform 103 can properly translate the values returned by the weighted constraint class 201 without the weighted constraint platform 104 even being aware of the actual names of the classes and interfaces in the test platform 103. However, the use of reflectivity to select randomized starting pages and actions does not necessarily need to be performed via reflection and instead the weighted constraint platform 104 may be hardcoded with the classes/interface names of the page controller class 204.

5.0 Example Flow

Figure 4A:
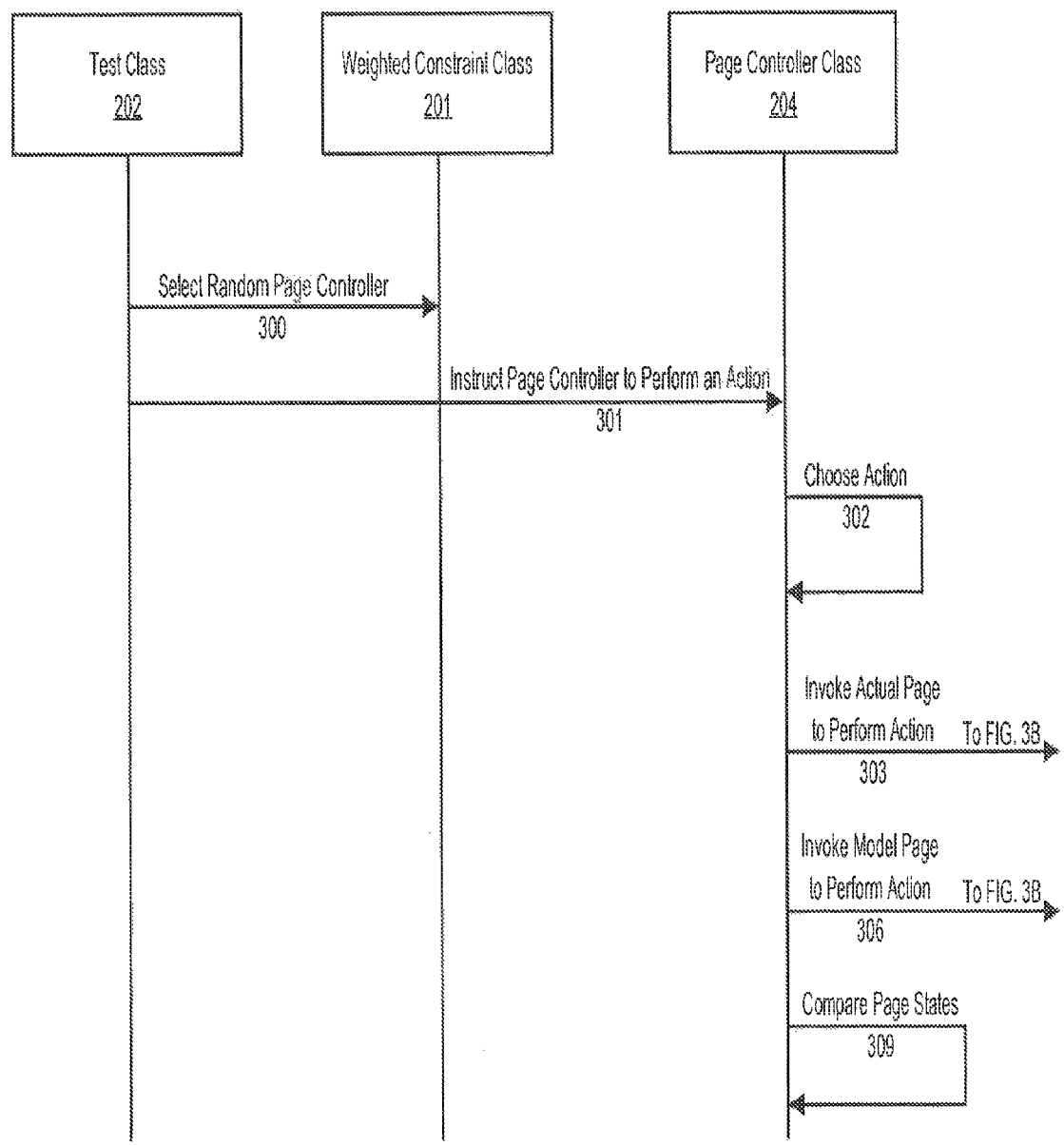
FIG. 4A illustrates a first view of an example process for testing an application according to an embodiment.

FIG. 4A and FIG. 4B illustrate an example flow for a testing process according to an embodiment. Although FIG. 4A and FIG. 4B depict a particular series of steps, other embodiments may add to the depicted steps, remove from the depicted steps, or perform the steps in a different order. In addition, certain steps may be performed in parallel using separate processors or through techniques such as multi-threading. For example, the actual page class 207 and model page class 208 may be invoked in parallel with actions being performed on both representations at the same time.

For the following example, it will be assumed that the computer 100 performs the steps via executing instructions represented by test platform 103. Furthermore, it will be assumed that the weighted constraint compiler 105 has already been invoked to transform the constraint specification 106 into the weighted constraint class 201 and page object data class 203 for use by the test platform 103. For brevity, the steps will be described as being performed by the corresponding classes of the test platform 103 which provide the instructions for performing said steps according to the example embodiment. However, in a practical environment, many of the steps may in fact be "performed" by objects instantiated from specialized classes which derive from generic classes depicted in FIG. 2A, FIG. 2B, and FIG. 2C and implement the particular functionality for a given context, such as a particular web page.

At step 300 the test class 202 selects a random page controller representing the starting page of the test. In an embodiment, the test class 202 selects a weighted random page controller by requesting a starting page from the weighted constraint class 201 which returns data identifying the starting page. The test class 202 then instantiates an object of the page controller class 204 corresponding to the starting page. For example, the test class 202 may request a random starting page from the weighted constraint class 201 and instantiate a page controller according to any of the techniques described above in Section 4.0—Weighted Constraint Overview.

At step 301 the test class 202 invokes the page controller class 204 for the selected page and instructs the page controller class 204 to perform a randomized action. In an embodiment, the page controller class 204 maintains a function or method which, when invoked, causes the page controller class 204 to select and perform a randomized action.

At step 302 the page controller class 204 selects a randomized action to perform on the starting page. In an embodiment, the page controller class 204 selects a randomized action by invoking the page object data class 203 and receiving a randomized value which corresponds to an action to perform. Furthermore, in the event that the selected action requires one or more inputs, the page controller class 204 makes additional requests to the page object data class 203 to select randomized values for those inputs. For example, the page controller class 204 may obtain randomized actions and input values from the page object data class 203 according to any of the techniques described above in Section 4.0—Weighted Constraint Overview.

At step 303, the page controller class 204 invokes the actual page class 207 to perform the selected action. For example, the page controller class 204 may create an instantiation of the actual page class 207 for the corresponding page and invoke a method or function which corresponds to the selected action. In some cases, the action selected by the page controller class 204 may involve multiple sub-actions. In such cases, the page controller class 204 may invoke the actual page class 207 separately for each individual sub-action. For example, if the action involves filing out a field then selecting a submit widget, the page controller class 204 may invoke the method or function corresponding to filing out the field then invoke the method or function corresponding to selecting the submit widget.

At step 304, the actual page class 207 performs the action on the actual page under test. In an embodiment, the actual page controller class 204 causes the action to be performed on the actual page under test via a communication mechanism, such as an API. For example, if the action involves clicking a button, the actual page class 207 may invoke the action class 212 of the actual page element class 210 corresponding to the button. The action class 212 may then respond by calling a browser or simulated browser through an API which causes the application 102 to perform the action.

At step 305, the actual page class 207 updates the data structures corresponding to changes resulting from the action. In an embodiment, the actual page class 207 scans the application 102 to determine which page elements have been modified, removed, or added as a result of performing the action. The actual page class 207 then updates the data structures representing the state of the page. For instance, the actual page class 207 may update the instantiations of the page container class 205 and/or page element class 209 classes to reflect the current state of the application 102 under test. In some cases, the performance of the action may cause the application 102 to update to a new page. For instance, performing the action of clicking a link may cause the browser to load a new page. In such events, the actual page class 207 returns data to the page controller class 204 identifying the new page.

At step 306, the page controller class 204 invokes the model page class 208 to perform the selected action on a model of page. For example, the page controller class 204 may create an instantiation of the model page class 208 for the corresponding page and invoke a method or function which corresponds to the selected action. In some cases, the action selected by the page controller class 204 may involve multiple sub-actions. In such cases, the page controller class 204 may invoke the actual page class 207 separately for each individual sub-action.

At step 307, the model page class 208 performs the action on a model of the page. In an embodiment, the model page class 208 includes test code which represents the expected behavior of the page after each action is performed. For example, the test code may directly update the data structures representing the affected page elements to how the state of the page should appear after the action is performed.

At step 308, the model page class 208 performs any cascading actions that result from the performance of the action selected by the page controller class 204. In an embodiment, performance of certain types of actions may trigger additional actions affecting the state of the page. For example, the selection of an "expand" button of an accordion widget may cause additional fields or widgets to appear. As a result, at step 308, the model page class 208 updates the instantiation of the page element container class 205 to add or remove page elements accordingly. In some cases, performance of an action may cause the application 102 to switch to a new page. In such cases, the model page class 208 returns data to the page controller class 204 identifying the new page.

At step 309, the page controller class 204 compares the states of the actual page class 207 and the model page class 208. In an embodiment, the page controller class 204 scans the page elements contained in the page element container class 205 of both representations and determines if there are any differences. For example, the page controller class 204 may determine whether both representations contain the same page elements and/or whether the data structures of the page elements indicate that the state is equivalent. As another example, the page controller class 204 may determine whether the action caused both representations application to resolve to the same page. In some embodiments, any difference represents a test failure which causes the test platform 103 to record the differences for later review and analysis. In other embodiments, the page controller class 204 may be configured to produce a failure only on certain conditions, such as the difference is the value of a field of a page element between the actual and model representations differing by a threshold amount. In addition to the comparison test, the page controller class 204 may perform other error checking functions at step 309 as well. For example, the page controller class 204 may determine if the actual or model representation sets a field to an invalid value and, if so, trigger a test failure. As another example, the test may check the actual vs. model representation of application or other persisted (e.g. database) state to determine if they differ and, if so, trigger a test failure. In an embodiment, in the event that both the actual page class 207 and model page class 208 interpret the action as loading a new page, the page controller class 204 instantiates a new page controller for the new page and returns that instantiation to the test class 202. Otherwise, the page controller class 204 returns a reference to itself.

In an embodiment, if the test has not failed by the end of step 309, control returns to the test class 202 which performs another test iteration by restarting at step 301. For example, the test class 202 may be configured to perform a specific number of iterations, run for a specified length of time, run until test failure, or run until a different condition has been fulfilled.

6.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
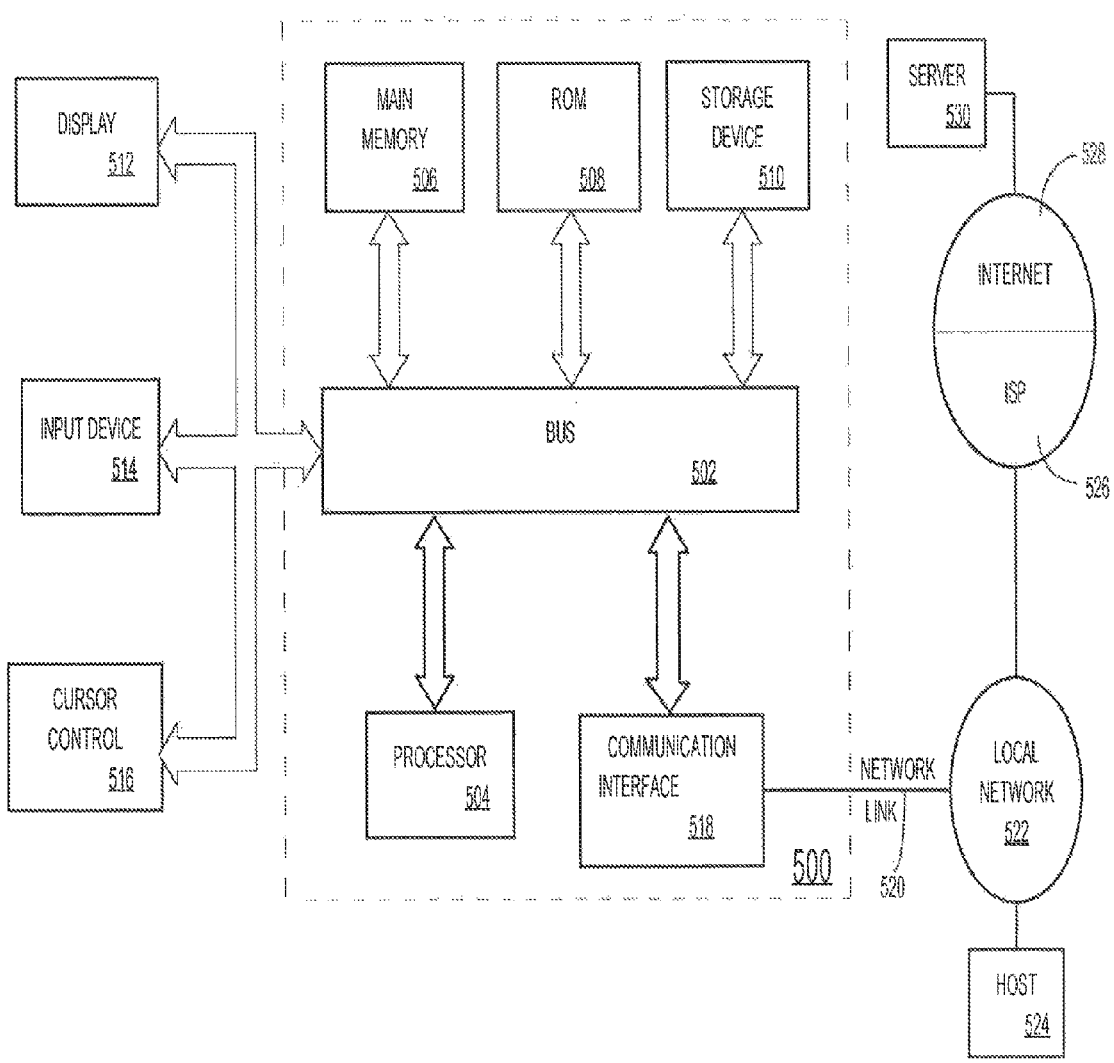
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 1006, such as a random access memory (RAM) or other dynamic storage device, coupled to bus 502 for storing information and instructions to be executed by processor 504. Main memory 1006 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CR), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 1006. Such instructions may be read into main memory 1006 from another storage medium, such as storage device 510. Execution of the sequences of instructions contained in main memory 1006 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 1006, from which processor 504 retrieves and executes the instructions. The instructions received by main memory 1006 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 2024 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    storing, by a computer comprising one or more hardware processors, information corresponding to a set of initial states associated with an application;
    storing, by the computer, information corresponding to a set of actions associated with the application;
    determining, based at least in part on metric information corresponding to usage of the application, first weight information corresponding to the set of actions;
    selecting, based at least in part on the first weight information and a randomized value, a first action from the set of actions;
    selecting randomly an initial state associated with the application from the set of initial states;
    causing the application to initialize to the randomly selected initial state and a model application to initialize to the randomly selected initial state;
    causing the application to perform the first action and to transition to a first result state in response to performing the first action;
    causing the model application to perform the first action and to transition to a second result state in response to performing the first action;
    performing a comparison between the first result state and the second result state; and
    generating, based at least in part on the comparison, a test result indication.

2. The method of claim 1, further comprising determining, based at least in part on the comparison, that the first result state is not equivalent to the second result state, wherein the test result indication corresponds to a test failure.

3. The method of claim 1, further comprising:
    determining, based at least in part on the metric information, second weight information corresponding to the set of initial states, wherein the randomly selected initial state is selected from the set of initial states based at least in part on the second weight information and the randomized value.

4. The method of claim 3, further comprising:
    selecting, based at least in part on the first weight information and a second randomized value, a second action from the set of actions; and
    selecting, based at least in part on the second weight information and the second randomized value, a second initial state from the set of initial states.

5. The method of claim 4, further comprising:
    causing the application to reinitialize to the second initial state and the model application to reinitialize to the second initial state;
    causing the application to perform the second action and to transition from the second initial state to a third result state in response to performing the second action;
    causing the model application to perform the second action and to transition from the second initial state to a fourth result state in response to performing the second action, wherein the fourth result state is different than the second result state;
    performing a second comparison between the third result state and the fourth result state; and
    generating, based at least in part on the second comparison, a second test result indication.

6. The method of claim 5, further comprising determining, based at least in part on the second comparison, that the fourth result state is equivalent to the third result state, wherein the second test result indication corresponds to a test pass.

7. The method of claim 3, wherein the application is a website and the randomly selected initial state corresponds to a state of an initially accessed web page of the web site.

8. The method of claim 1, further comprising:
    determining updated metric information corresponding to subsequent usage of the application; and
    adjusting, based at least in part on the updated metric information, the first weight information and the second weight information.

9. A system, comprising:
    at least one processor; and
    at least one memory storing computer-executable instructions, that in response to execution by the at least one processor, causes the system to perform operations comprising:
        storing information corresponding to a set of initial states associated with an application;
        storing information corresponding to a set of actions associated with the application;
        determining, based at least in part on metric information corresponding to usage of the application, first weight information corresponding to the set of actions;
        selecting, based at least in part on the first weight information and a randomized value, a first action from the set of actions;
        selecting randomly an initial state associated with the application from the set of initial states;
        causing the application to initialize to the randomly selected initial state and a model application to initialize to the randomly selected initial state;
        causing the application to perform the first action and to transition to a first result state in response to performing the first action;
        causing the model application to perform the first action and to transition to a second result state in response to performing the first action; and
        performing a comparison between the first result state and the second result state; and generating, based at least in part on the comparison, a test result indication.

10. The system of claim 9, wherein the operations further comprise determining, based at least in part on the comparison, that the first result state is not equivalent to the second result state, wherein the test result indication corresponds to a test failure.

11. The system of claim 9, wherein the operations further comprise:
    determining, based at least in part on the metric information, second weight information corresponding to the set of initial states, wherein the randomly selected initial state is selected from the set of initial states based at least in part on the second weight information and the randomized value.

12. The system of claim 11, wherein the operations further comprise:
    selecting, based at least in part on the first weight information and a second randomized value, a second action from the set of actions; and
    selecting, based at least in part on the second weight information and the second randomized value, a second initial state from the set of initial states.

13. The system of claim 12, wherein the operations further comprise:
    causing the application to reinitialize to the second initial state and the model application to reinitialize to the second initial state;
    causing the application to perform the second action and to transition from the second initial state to a third result state in response to performing the second action;
    causing the model application to perform the second action and to transition from the second initial state to a fourth result state in response to performing the second action, wherein the fourth result state is different than the second result state;
    performing a second comparison between the third result state and the fourth result state; and
    generating, based at least in part on the second comparison, a second test result indication.

14. The system of claim 13, wherein the operations further comprise determining, based at least in part on the second comparison, that the fourth result state is equivalent to the third result state, wherein the second test result indication corresponds to a test pass.

15. The system of claim 11, wherein the application is a website and the randomly selected initial state corresponds to a state of an initially accessed web page of the web site.

16. The system of claim 9, wherein each action of the set of actions is assigned a corresponding probability of selection based at least in part on the first weight information.

17. The system of claim 9, wherein the operations further comprise:
    determining updated metric information corresponding to subsequent usage of the application; and
    adjusting, based at least in part on the updated metric information, the first weight information and the second weight information.

18. A non-transitory computer-readable device storing instructions, that in response to execution by at least one hardware processor, causes a system to perform operations comprising:
    storing information corresponding to a set of initial states associated with an application;
    storing information corresponding to a set of actions associated with the application;
    determining, based at least in part on metric information corresponding to usage of the application, first weight information corresponding to the set of actions;
    selecting, based at least in part on the first weight information and a randomized value, a first action from the set of actions;
    selecting randomly an initial state associated with the application from the set of initial states;
    causing the application to initialize to the randomly selected initial state and a model application to initialize to the randomly selected initial state;
    causing the application to perform the first action and to transition to a first result state in response to performing the first action;
    causing the model application to perform the first action and to transition to a second result state in response to performing the first action;
    performing a comparison between the first result state and the second result state; and
    generating, based at least in part on the comparison, a test result indication.

19. The non-transitory computer-readable device of claim 18, wherein the operations further comprise:
    determining, based at least in part on the metric information, second weight information corresponding to the set of initial states, wherein the randomly selected initial state is selected from the set of initial states based at least in part on the second weight information and the randomized value.

20. The non-transitory computer-readable device of claim 19, wherein the operations further comprise:
    selecting, based at least in part on the first weight information and a second randomized value, a second action from the set of actions;
    selecting, based at least in part on the second weight information and the second randomized value, a second initial state from the set of initial states;
    causing the application to reinitialize to the second initial state and the model application to reinitialize to the second initial state;
    causing the application to perform the second action and to transition from the second initial state to a third result state in response to performing the second action;
    causing the model application to perform the second action and to transition from the second initial state to a fourth result state in response to performing the second action, wherein the fourth result state is different than the second result state;
    performing a second comparison between the third result state and the fourth result state; and
    generating, based at least in part on the second comparison, a second test result indication.

* * * * *

UNITED STATES PATENT AND TRADEMARK OFFICE
CERTIFICATE OF CORRECTION

PATENT NO. : 9,971,672 B2  
APPLICATION NO. : 15/144306  
DATED : May 15, 2018  
INVENTOR(S) : Anne S. Stern et al.

Page 1 of 1

It is certified that error appears in the above-identified patent and that said Letters Patent is hereby corrected as shown below:

On the Title Page

Under Related U.S. Application Data
(63) "Continuation of application No. 12/245,587" should read -- Continuation of application No. 14/245,587 --

Signed and Sealed this
Thirty-first Day of July, 2018

Andrei Iancu
*Director of the United States Patent and Trademark Office*